United States Patent [19]

Lee

[11] Patent Number: 5,603,083
[45] Date of Patent: Feb. 11, 1997

[54] MICROCELL BASE STATION ANTENNA PATTERN FOR DENSE URBAN AREAS

[75] Inventor: Lin-Nan Lee, Potomac, Md.

[73] Assignee: Hughes Electronics, Los Angeles, Calif.

[21] Appl. No.: 393,641

[22] Filed: Feb. 24, 1995

[51] Int. Cl.$^6$ .................................................. H04Q 7/36
[52] U.S. Cl. ........................................ 455/33.1; 455/56.1
[58] Field of Search .................................. 455/33.1, 33.2, 455/33.3, 33.4, 56.1, 62, 63, 34.1, 34.2; 379/59

[56] References Cited

U.S. PATENT DOCUMENTS

| | | |
|---|---|---|
| 4,128,740 | 12/1978 | Graziano . |
| 4,315,222 | 2/1982 | Saleh . |
| 4,347,625 | 8/1982 | Williams . |
| 4,617,573 | 10/1986 | Davidson . |
| 5,014,342 | 5/1991 | Pudsey ................................ 455/33.1 |

FOREIGN PATENT DOCUMENTS

| 4225582 | 2/1994 | Germany ............................... 455/33.1 |
|---|---|---|

OTHER PUBLICATIONS

The Bell System Tech Journal Jan. 1979, vol. 58, No. 1.
Cell Planning in Manhattan Environments, IEEE 1992 Mikael Gudmundson Radio Communication System Royal Institute of Technology, ELECTRUM 207 S-164 40 Stockholm-Kista, Sweden.

Handoff Effects in Microcellular Systems, IEEE 1992 Xin (Jack) Luo and David Everitt Department of Electrical and Electronic Engineering, The University of Melbourne, Parkville 3052, Victoria, Australia.

*Primary Examiner*—Reinhard J. Eisenzopf
*Assistant Examiner*—Nguyen Vo
*Attorney, Agent, or Firm*—Gordon R. Lindeen, III; Wanda K. Denson-Low

[57] ABSTRACT

A pattern and a method of establishing a pattern of microcell base station antennae in dense urban areas. The base station antennae are each configured to transmit on one of several sets of frequencies, and are placed at intersections on a grid of horizontally parallel and vertically parallel streets. The pattern distributes the antennae in two separate repeating sequences running diagonally on the grid. By using tall buildings between the streets as propagation blockers, the pattern optimizes the use of a limited number of allocated frequencies and minimizes co-channel and adjacent channel interference.

21 Claims, 6 Drawing Sheets

MICROCELL BASE STATION ANTENNA PATTERN FOR DENSE URBAN AREAS

BACKGROUND OF THE INVENTION

This invention relates to cellular communications, and more particularly to a pattern of microcell base station antennae for use in dense urban areas.

Wireless mobile telecommunications systems utilize radio signals to exchange information between fixed-wire base stations and free-standing mobile stations. Each base station transmits from an antenna over a fixed-area range called a cell. In order to provide service to mobile stations over a large geographic area, many cells are positioned over the area to provide complete coverage.

In typical cellular configurations, base station antennae are located high above the ground, resulting in large, hexagonal or circular-shaped macrocells with the antenna located at the center of the cell. The transmissions from the base station propagate outward 360 degrees from the antenna. These cells are often referred to as "omni-directional."

Because the spectrum of radio frequencies allocated for telecommunications is limited, each cell operates on a different subset of frequencies to minimize the density of the used spectrum in a particular geographic area. To optimize the use of the allocated frequencies, cellular systems will reuse frequency sets from other cells. The reuse of frequencies is restricted, however, by co-channel interference from nearby cells which use the same frequencies. Accordingly, various cell layouts and patterns have been developed to maximize the distance between the closest cells operating on the same frequencies. The prior art shows that various distributions of frequencies may be made among cells depending on the relative location of each cell.

Using standard cell arrangements in dense urban areas presents some difficulties, however. The landscape of typical urban areas contains blocks of tall buildings separated by a grid-like pattern of streets. In these environments, the normally circular propagation patterns of base station antennae are blocked by the tall buildings. Accordingly, smaller cells called "microcells" are used in these environments. These smaller microcells are created by locating base stations and their antennae close to street level. The surrounding buildings are purposely used as propagation obstacles to prevent interference among neighboring microcells.

In contrast to the circular transmission propagation of ordinary cells, however, these urban microcells, which utilize buildings as propagation blockers, transmit only along streets which are within the line-of-sight of the base station antenna. Microcell patterns for these environments are thus designed differently from those of conventional macrocells. Like any cellular system, the allocated frequency band is limited, and reuse of the same frequencies at separate locations is critical. Furthermore, the ability of the microcells to reuse the same frequencies at a closer distance is often the reason for service providers to convert existing macrocells to microcells in urban or suburban areas to improve the system capacity. Reuse of the same frequencies generates co-channel interference which must be controlled to an acceptable level. In urban microcells, co-channel interference is dominated by interference from cells within the line-of-sight of another cell. Previous cell plans for these city environments were typically classified into "half-square", "full-square", or "rectangular" cell patterns. These cell patterns generally required a large number of microcells to cover an urban area, and did not take advantage of the full transmission range available to some base stations.

SUMMARY OF THE INVENTION

The present invention provides a novel pattern of microcell base station antennae in a dense urban environment where the streets form substantially rectangular grids. The pattern optimizes frequency reuse and minimizes co-channel and adjacent channel interference among microcells.

The disclosed embodiments preferably comprise a pattern of microcellular base station antennae distributed over a grid-like urban environment. Each base station and its corresponding antenna operates at a predetermined set of frequencies, and preferably transmits through an antenna positioned over an intersection. The antennae are multi-directional, and their signals propagate along the streets which form the intersection. The antennae are preferably located in the center of the intersections, below the height of the surrounding buildings.

The pattern described herein allows microcells to be placed at intersections spaced several blocks apart. Thus, by skipping several intersections between base stations and their antennae, substantially fewer microcells are needed to cover a particular geographic area. Trunking efficiency is improved due to larger coverage area per cell. Also, the smaller peak-to-average traffic ratio in a larger cell results in fewer idle channel units.

The present invention improves coverage efficiency by allowing the cells to transmit in four directions. The allocation of frequencies minimizes co-channel interference because frequency reuse along line-of-sight cells is minimized.

The pattern of the present invention positions antennae of base stations operating at assigned frequency sets at intersections on the grid of streets. A set sequence of base station antennae forms a diagonal path over intersections on the grid. A second, different sequence of base station antennae is positioned over intersections along a second diagonal path parallel to the path of the first sequence.

The invention itself, together with further objects and attendant advantages, will be understood by reference to the following detailed description, taken in conjunction with the accompanying drawings.

DETAILED DESCRIPTION OF THE INVENTION

Figure 1:
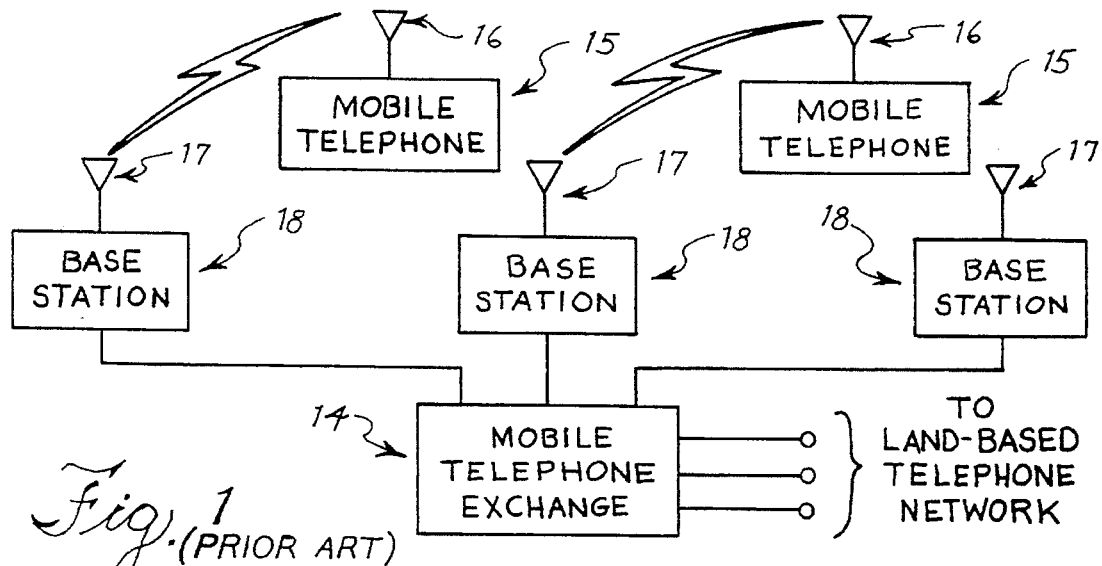
FIG. 1 is a block diagram of a conventional mobile telephone communications system.

Referring now to FIG. 1, an example of a typical mobile telephone communication system is shown. In this system, a plurality of base stations 18 each having an antenna 17 is deployed throughout a geographic area. The base stations are each linked to a mobile telephone exchange 14, which is in turn coupled to a conventional land-based telephone network. Each base station 18 and its antenna 17 may operate on a separate RF frequency to communicate with mobile telephones 15. Preferably, the antenna 17 is located relatively close to its corresponding base station 18. Each mobile telephone 15 utilizes an antenna 16 to transmit to and receive from base stations operating on a matching frequency.

Figure 2:
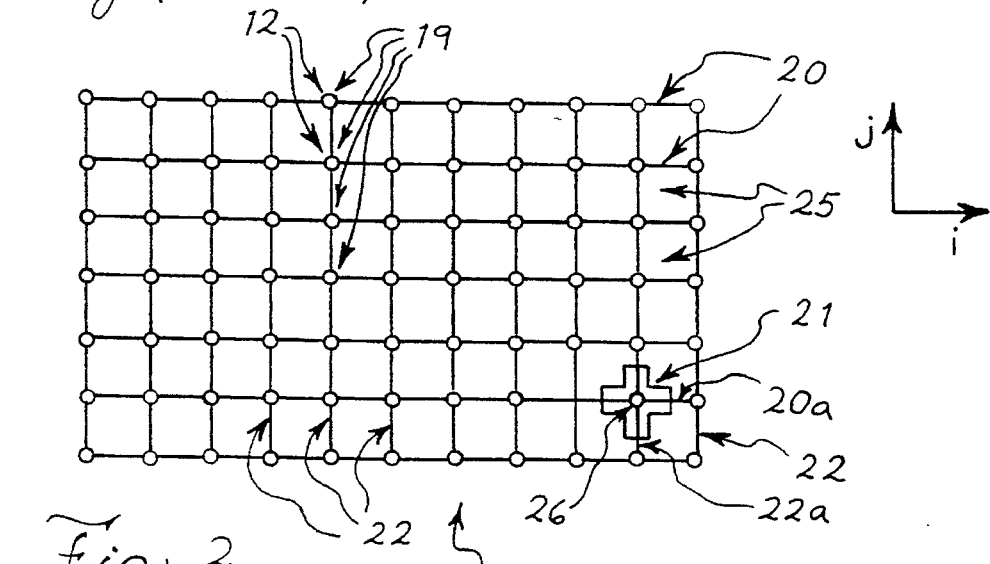
FIG. 2 illustrates a conventional half-square cell pattern.

FIG. 2 shows an aerial view of a conventional "half-square" cell pattern on a map of urban streets laid out in a grid pattern. The vertical axis is defined in the "j" direction, and the horizontal axis is defined in the "i" direction. Parallel horizontal streets 20 run horizontally parallel to the i axis. Parallel vertical streets 22 run vertically parallel the j axis, and intersect the horizontal streets 20 to form intersections 19. A grid of streets 89 is formed with blocks of buildings 25 represented by squares on the cell plan. Each base station and its antenna 12 (represented by a dot on the Figure over intersections 19) is located at approximately street level over the center of each intersection 19. Because propagation of the base station antenna's transmission is restricted by the buildings within blocks 25, the propagation coverage from a single base station antenna 26 occurs only along the individual streets 20a and 22a which intersect under antenna 26. The propagation pattern 21 transmits to or covers ½ block in each direction along streets 20a and 22a. Thus, coverage for this pattern is approximately one square block per cell.

Figure 3:
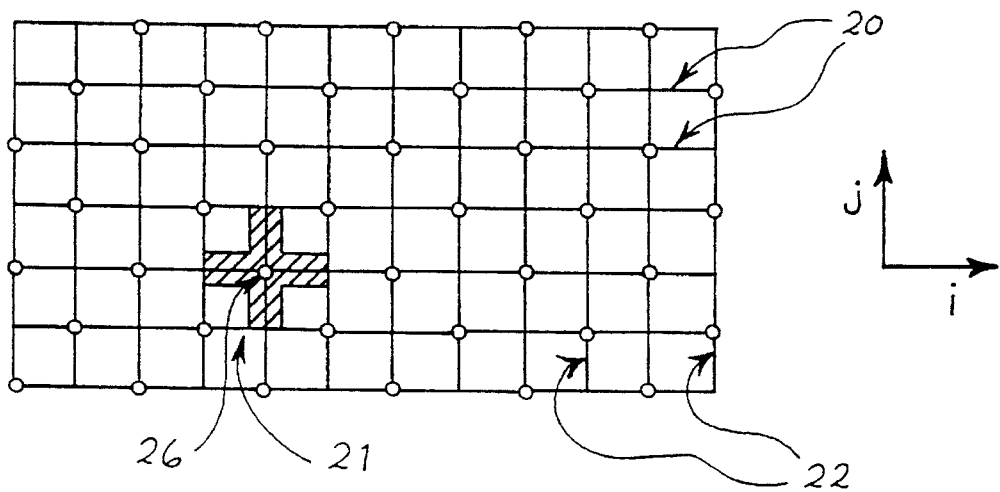
FIG. 3 illustrates a conventional full-square cell pattern.

FIG. 3 illustrates a conventional "full-square" cell pattern. One base station antenna 26 is located at every other intersection in a diagonal pattern. Each cell covers one block in each of four directions as shown by propagation pattern 21, producing a coverage of approximately two square blocks per cell.

Figure 4:
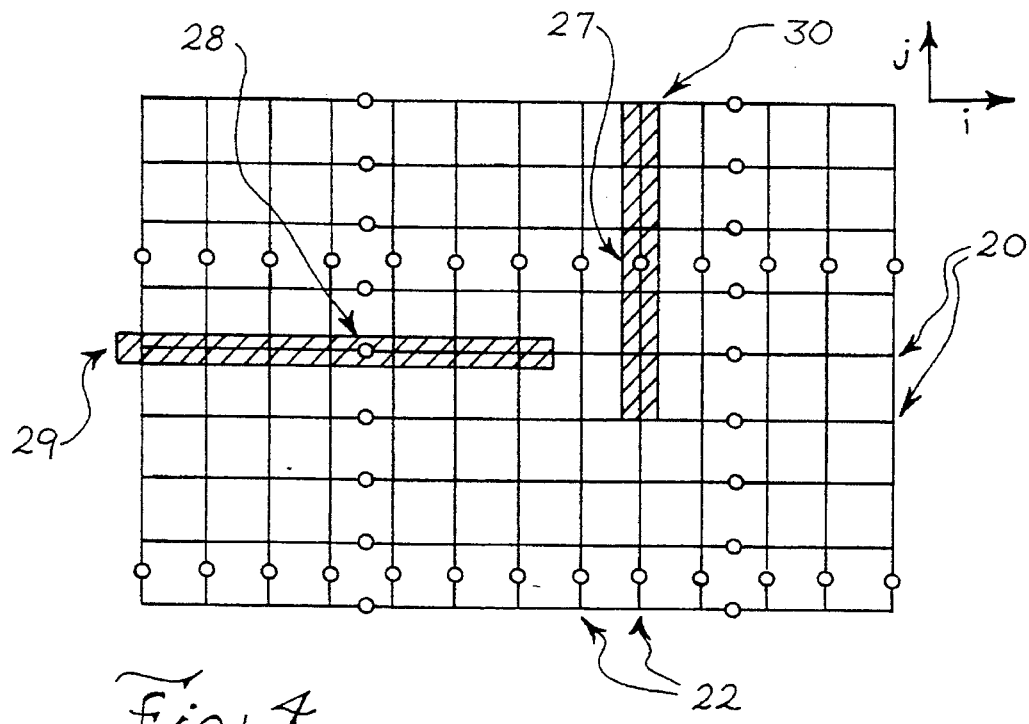
FIG. 4 illustrates a conventional rectangular cell pattern.

FIG. 4 illustrates a conventional "rectangular" cell pattern. Each cell covers n/2 blocks in two directions, and an n-block by n-block area requires n cells for horizontally running streets 20 and n cells for vertically running streets 22. Coverage is therefore n/2 square blocks per cell. Because each cell can generally cover more than two blocks along one street in each direction, rectangular cells are often more efficient than half-square or full-square cells. The propagation patterns along line-of-sight paths are shown at 29 and 30.

Figure 5:
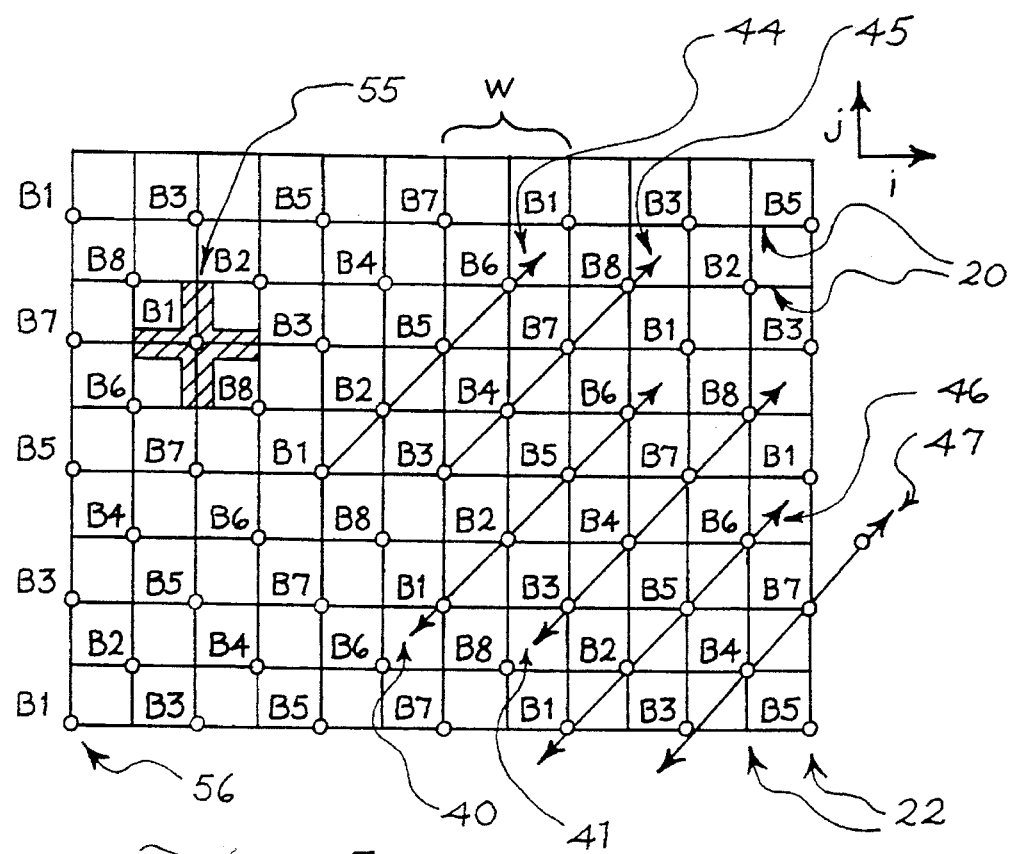
FIG. 5 illustrates a (1,1) cell pattern according to the present invention implemented using eight discrete frequency sets.

FIG. 5 illustrates a cell pattern in accordance with the present invention. Base stations and their antennae, represented by numerals B1 through B8, are preferably located at every other intersection 56 of i-running streets 20 and j-running streets 22. The pattern has a "factor-8" frequency reuse, in that each base station and its corresponding antenna operates on one of eight different frequency sets. For example, all base stations and antennae marked "B1" use the same frequency set, and all base stations and antennae marked "B2" use the same frequency set, although the B2 frequency set is different from that used by the B1 stations.

Propagation coverage or microcells 55 for the cells are approximated by a cross-shape down intersecting streets, as opposed to the circular or hexagonal coverage offered by a conventional macrocell.

The pattern of base station antennae operating on the eight different frequency sets can be established diagonally from two repeating sequences of base station antennae. As shown in FIG. 5, the first sequence 40 comprises repeating sequence "B1, B2, B5, B6" and runs diagonally at an even interval, forming a diagonal line. Each base station antenna in the sequence is located a distance x blocks in the i direction and y blocks in the j direction from the previous antenna in sequence. For example, base station antenna B5 is located at an intersection 1 block in the i direction (1 block to the right) and 1 block in the j direction (1 block up) from B2, the previous base station antenna in sequence. Therefore, in this configuration, x=1 block and y=1 block.

The second sequence of base station antennae 41 comprises repeating sequence "B3, B4, B7, B8" and runs along a parallel diagonal line to the first sequence 40. The base station antenna B3 of the second sequence 41, however, must be on the same "i" (horizontal) street as base station antenna B1 of the first sequence, separated by distance w. The second sequence 41 is thus separated horizontally from the first sequence 40 by w blocks. In this configuration, w=2 blocks. The placement of base station antennae within the second sequence is also dictated by the same distances x and y. Thus, in this embodiment, base station antenna B4 is located 1 block in the i direction and 1 block in the j direction from B3, the previous base station antenna in the second sequence 41.

The group of two sequences each repeat along their diagonal-line paths. Identical sequences such as 44 and 45, each comprising the same two sequences as 40 and 41, respectively, also run parallel to this pattern. In this embodiment, the sequences to the left of sequences 40 and 41 are shifted two sequential antennae in the diagonal direction of the running sequences. For example, in sequence 44, base station antenna B1 is shifted up two positions diagonally from antenna B1 of sequence 40. The same sequences are repeated (with the diagonal shift) again to the left of sequences 44 and 45.

This pattern provides a scheme of distributing frequency sets so that the distance between microcells having the same frequency set is maximized along their line-of-sight paths. This can be seen, for example, by the fact that any base station antenna B5 is distant from any other base station antenna B5 along either of the two streets that intersect below any given base station antenna B5.

Figure 6:
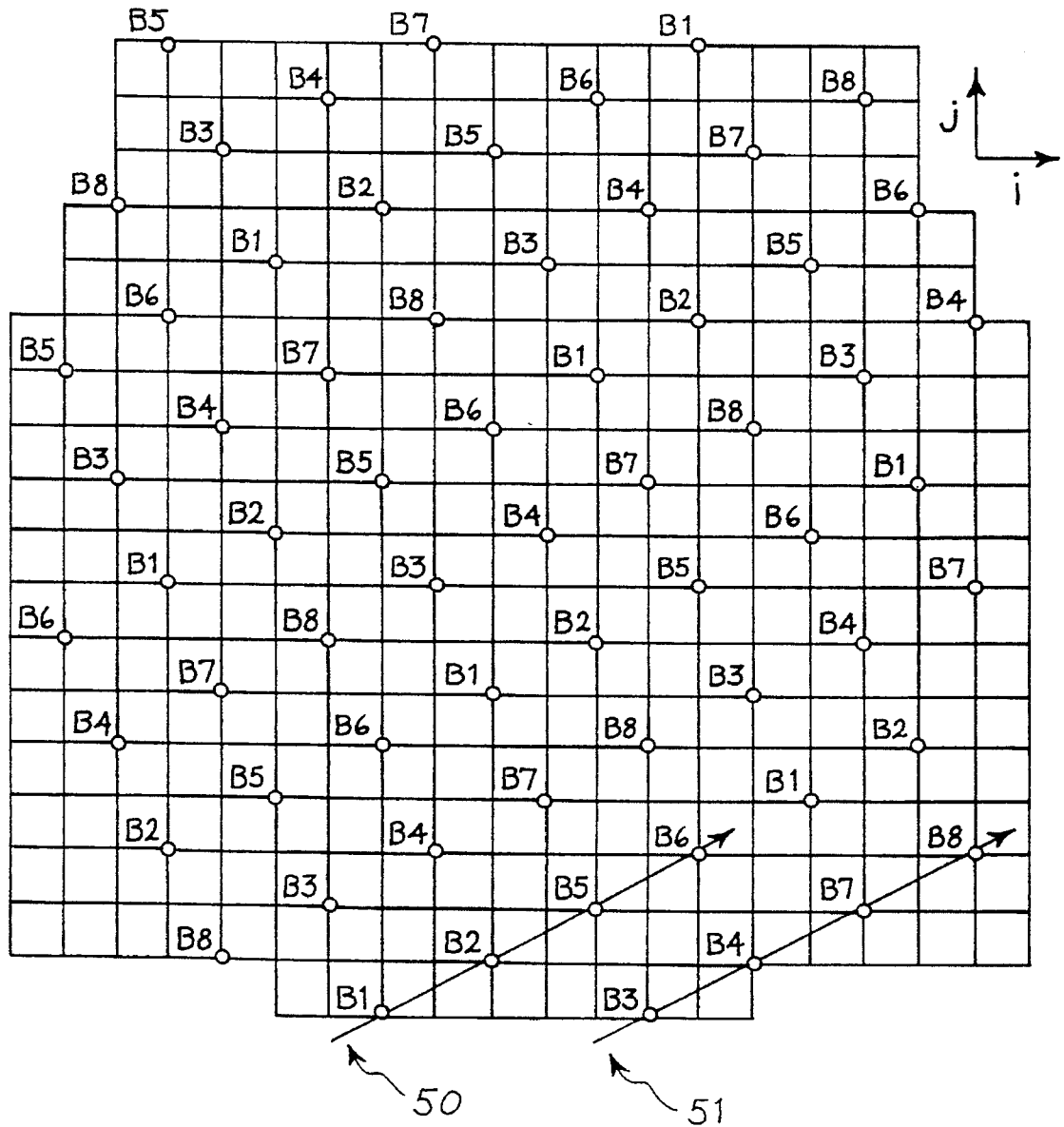
FIG. 6 illustrates a (2,1) cell pattern according to the present invention implemented using eight discrete frequency sets.

Referring now to FIG. 6, a more separated cell pattern of the present invention is shown having the same repeating sequences. The distance between the sequential base station antennae, however, is 2 blocks in the i direction and one block in the j direction. Therefore, x=2 blocks, and y=1 block. First sequence 50 and second sequence 51 display the same parallel diagonal configuration as the embodiment in FIG. 5, but they are separated from each other by 5 horizontal blocks. Thus, w=5 blocks. Again, the group of two sequences 50 and 51 repeats with a two-position diagonal shift. This pattern takes advantage of more powerful base stations which can transmit greater distances along the line-of-sight streets.

Figure 7:
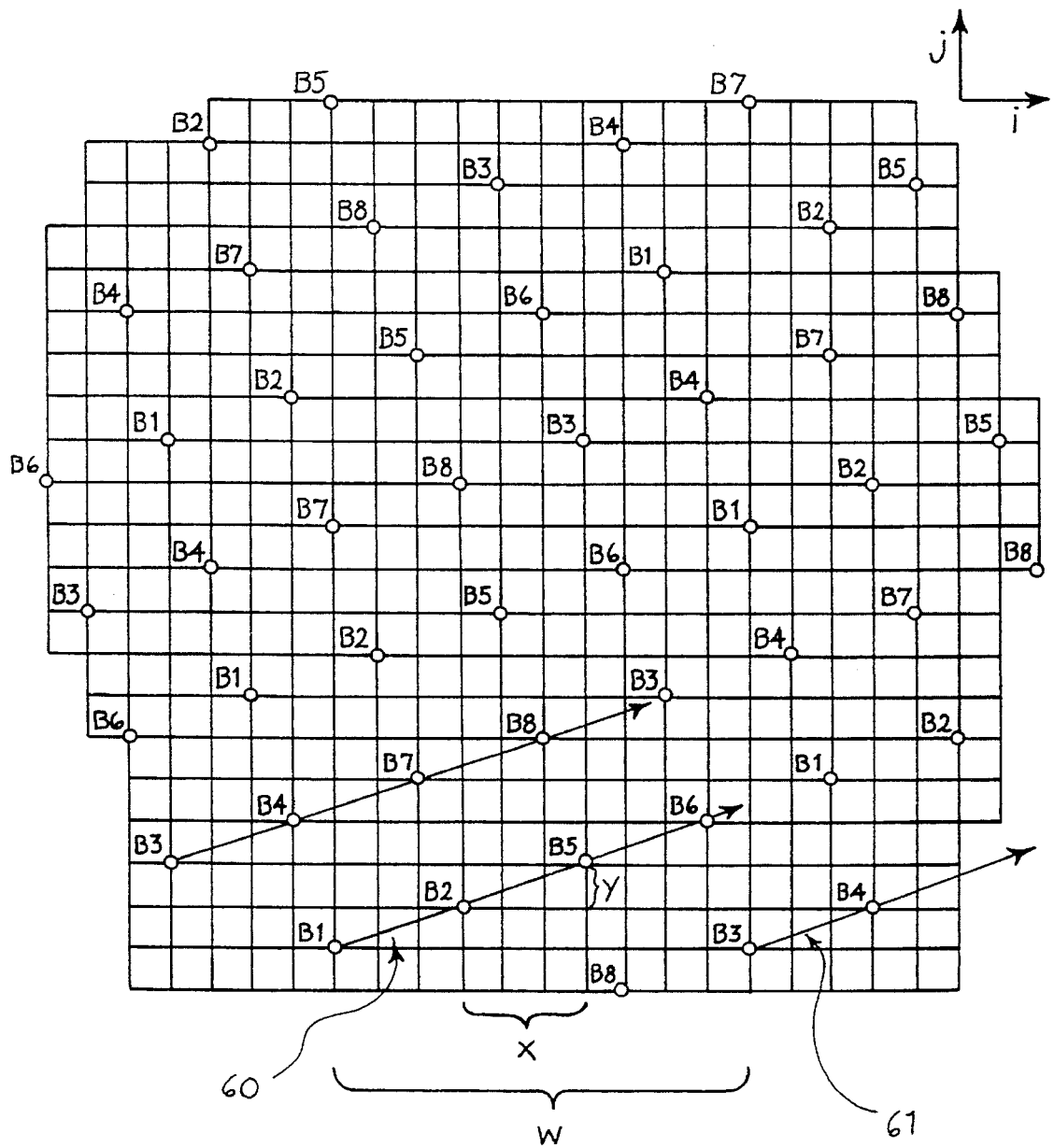
FIG. 7 illustrates a (3,1) cell pattern according to the present invention implemented using eight discrete frequency sets.

FIG. 7 shows an even greater separation of base station antennae. In this embodiment, x=3 blocks, y=1 block, and w=10 blocks. Repeating sequences 60 and 61 are identical to the previous embodiments shown in FIGS. 5 and 6.

Figure 8:
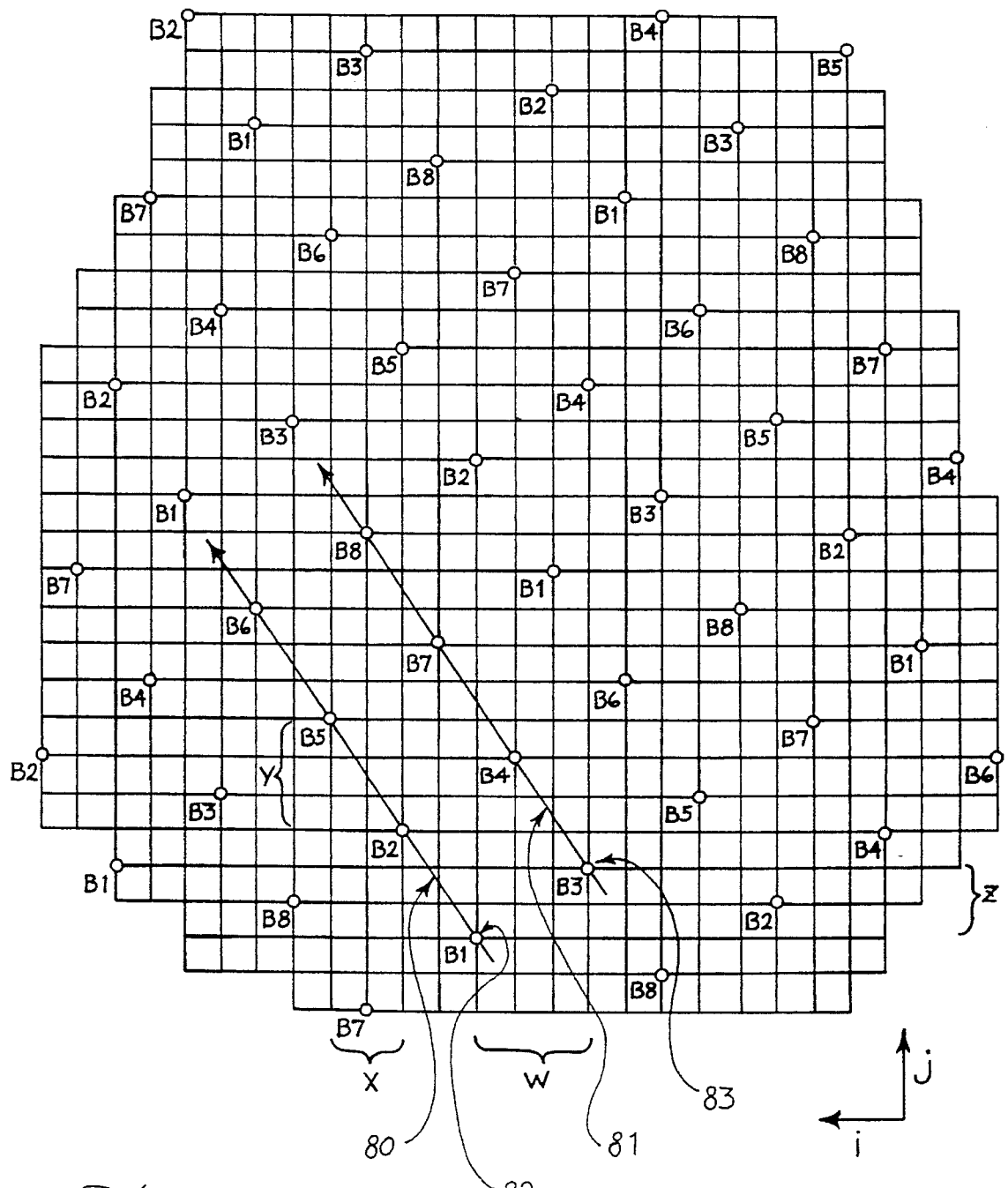
FIG. 8 illustrates a (3,2) cell pattern according to the present invention implemented using eight discrete frequency sets.

Note that the i and j directions (axes) may be defined in different orientations. For example, FIG. 8 shows a pattern of the present invention executed on a grid having the i direction defined toward the left side of the map instead of the right side, as in the previous figures. Note also that it is not necessary for base stations within two adjacent parallel sequences to share any of the same i-running or j-running streets. This is also illustrated in FIG. 8. In the embodiment shown, the distance between sequential base station antennae is two blocks in the i direction and three blocks in the j direction. The two sequences are also separated by distances in both the i and j directions. For example, base station B1 82 of sequence 80 is separated from base station B3 83 of sequence 81 by three blocks in the i direction and two blocks in the j direction. Therefore, in this embodiment, x=2, y=3, w=3, and z=2. z defines the separation of the closest base stations between two sequences in the j direction. In FIGS. 5–7, z=0.

It is preferred that the values for w, x, y and z are prime integers, although the patterns of the invention disclosed herein may also be applied using non-prime values.

The above patterns optimize the signal-to-interference ratio (C/I) between adjacent cells. For the above patterns, the signal-to-interference ratio is calculated from the following equation:

$$C/I=1/[(1/(B-1))^P+(1/(B+1))^P]$$

Where B is the number of blocks to the next nearest cell on the same street and P is the propagation exponent. In a grid-like urban environment, if the base station antennae are positioned lower than the surrounding buildings, the attenuation caused by the buildings is typically greater than 10 dB. Furthermore, the buildings also cause attenuation of at least 15 dB for signals that are diffracted around their corners. Thus, as described previously, the co-channel interference is dominated by sources on the same street, within the line-of-sight of the concerned antenna.

Antenna transmission characteristics are dependent on the "Fresnel zone" of the antenna, which is a function of an antenna's height and the frequency on which it operates. In the preferred embodiments described herein, the antennae will preferably range between 5 to 20 meters in height. The resulting zone will range between 80 to 320 meters along each line-of-sight street for 800 MHz frequency, and 190–760 meters for a 1900 MHz frequency. Within the Fresnel zone the propagation exponent is typically 2, and outside the Fresnel zone the propagation exponent is typically 4. Thus, P is 2 for the desired signal (within the Fresnel zone), and 4 for the interference (outside the Fresnel zone). As the worst case for interference, the propagation exponent can be assumed to be 2.5 for both the desired signal and the interference. This situation occurs when the distance to the interfering cell is less than the Fresnel zone distance. (See recent Joint Technical Committee on Wireless Access, Telephone Industry Association T1, Aug. 1, 1994, (AIR) Document No. 94.08.01-065R4).

The standards for analog cellular systems deployment in the U.S. is specified by the Advanced Mobile Phose Service ("AMPS"). The specifications set forth by AMPS recommend that the signal-to-interference ratio for a system should be at least 17 dB. To achieve a C/I ratio of 17 dB or greater, the distance-to-co-channel cell/cell radius (D/R) must be greater than 8 for an propagation exponent of 2. This D/R ratio can be accomplished by a reuse factor of 8, as shown in the above figures of the preferred embodiment. With this reuse pattern, the interference is dominated by the closest line-of-sight cells on the same street. At the cell boundary, therefore, $$C/I=1/[(1/7)^{2.5}+(1/9)^{2.5}]=19.3 dB$$

For European digital cellular standards such as those established by Global System Mobile ("GSM"), the recommended signal-to-interference ratio is 9 dB or lower. This type of system would allow a frequency reuse factor of 4 instead of a reuse factor of 8, if the desired signal and interference both have a propagation exponent of 4. At the cell boundary, therefore, $$c/I=1/[(1/3)^4+(1/5)^4]=17.9 dB$$

Figure 9:
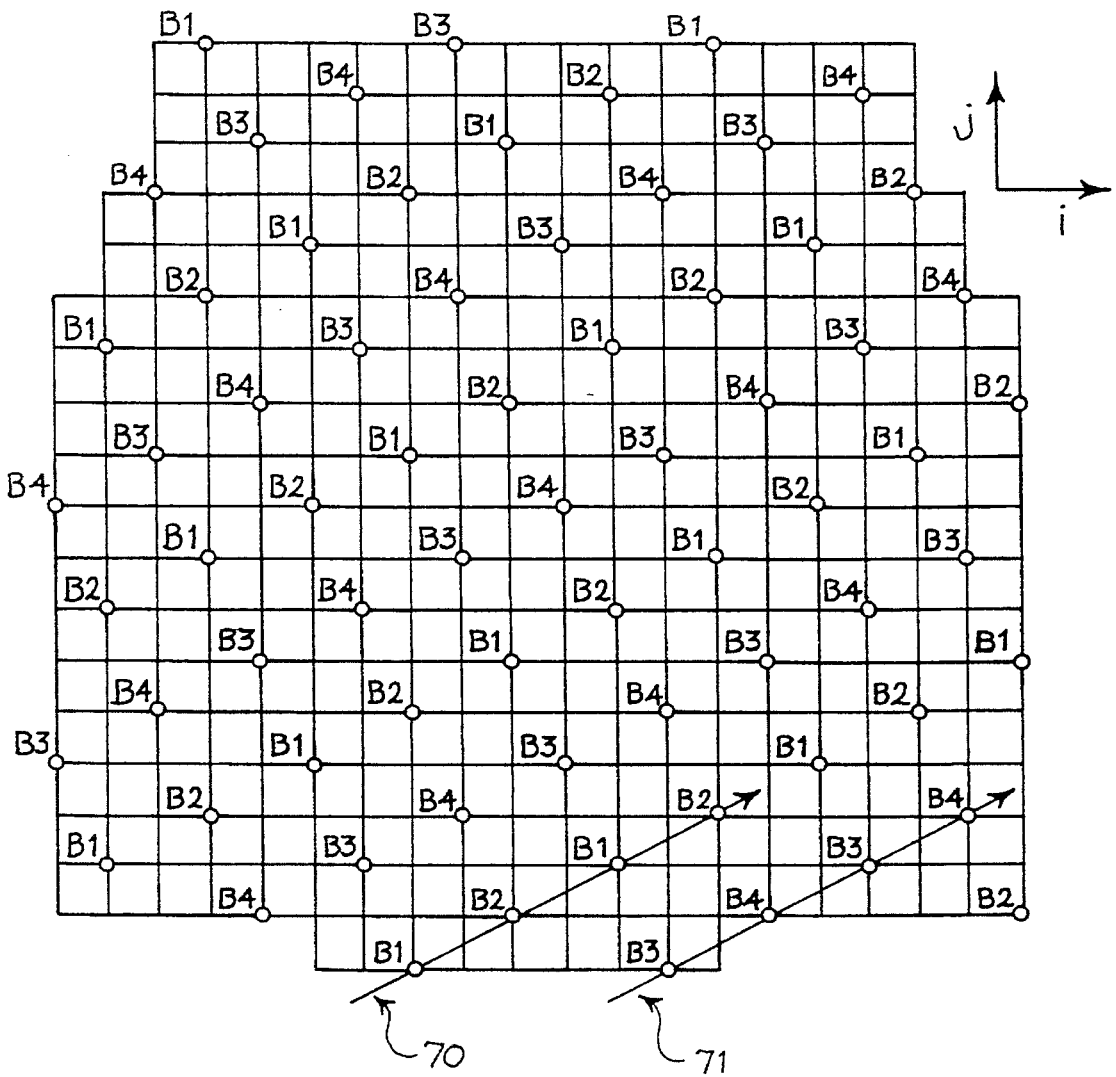
FIG. 9 illustrates the cell pattern of FIG. 6 implemented using four discrete frequency sets.

To implement the invention using a frequency reuse factor of four, the user can simply substitute the first four frequency sets designated as B1, B2, B3, and B4 for the last four frequency sets B5, B6, B7, and B8, respectively. An exemplary pattern of the present invention utilizing a frequency reuse factor of four is shown in FIG. 9. In this embodiment, the pattern of FIG. 6 is modified as described above to reuse four different frequency sets instead of eight. The first diagonally running sequence 70 is thus "B1, B2, B1, B2"; and the second diagonally running sequence 71 is "B3, B4, B3, B4."

It should be noted that the grid-like pattern of the urban area need not have streets intersecting perpendicularly to each other. The invention herein may also be embodied in urban areas having streets intersecting at obtuse angles or spaced at uneven intervals. Because the base station antennae transmit multidirectionally and use street-lining buildings as propagation blockers, the angles and positions of the streets within the grid are not critical.

It will thus be apparent to those skilled in the art that various modifications and variations can be made in the method and pattern of the present invention without departing from the spirit or scope of the invention. Thus, it is intended that the present invention cover modifications and variations of this invention provided they come within the scope of the appended claims and their equivalents.

What is claimed is:

1. A pattern of cellular base station antennae comprising:
a first repeating sequence of antennae B1, B2, B5, B6, each of said antennae positioned at an intersection on a grid of intersecting streets, said antennae evenly spaced at a uniform interval forming a first diagonal line of antennae on said grid;
a second repeating sequence of antennae B3, B4, B7, B8, each of said second sequential antennae positioned at an intersection on said grid, said second sequential antennae evenly spaced at said uniform interval forming a second diagonal line of antennae parallel to said first diagonal line, said second sequence beginning with antenna B3 positioned on the same street as any of said antenna B1; wherein a different set of frequencies is allocated to each antenna B1, B2, B3, B4, B5, B6, B7, and B8.

2. A pattern of cellular base station antennae according to claim 1, further characterized in that said pattern repeats parallel to said first diagonal line.

3. A pattern of cellular base station antennae according to claim 1, further characterized in that said grid of streets defines blocks in between said streets.

4. A pattern of cellular base station antennae according to claim 3, wherein a first set of streets in said grid run parallel to each other in the i direction and a second sets of streets in said grid run parallel to each other in the j direction; said first and second set of streets intersecting each other at approximately 90 degrees.

5. A pattern of cellular base station antennae according to claim 4, wherein in said first sequence, any antenna is positioned 1 block in the i direction and 1 block in the j direction from the previous antenna in said first sequence.

6. A pattern of cellular base station antennae according to claim 4, wherein in said second sequence, any of said second sequential antennae is positioned 1 block in the i direction and 1 block in the j direction from the previous second sequential antenna in said second sequence.

7. A pattern of cellular base station antennae in an area having a first set of parallel streets running in the i direction and a second set of parallel streets running in the j direction, said first set of parallel streets intersecting said second set of parallel streets forming a grid of blocks, said pattern comprising:

a first repeating sequence of base station antennae B1, B2, B5, B6, each of said sequential antennae located at an intersection x blocks in the i direction and y blocks in the j direction from the preceding antenna in sequence;

a second repeating sequence of base station antennae B3, B4, B7, B8, each of said second sequential antennae located at an intersection x blocks in the i direction and y blocks in the j direction from the preceding antenna in said second sequence, said second sequence beginning with antenna B3 positioned at an intersection w blocks in the i direction from any of said antennae B1;

wherein a different set of frequencies is allocated to each antenna B1, B2, B3, B4, B5, B6, B7, and B8, and w, x, and y represent a distance in blocks on any of said streets.

8. A pattern of cellular base station antennae according to claim 7, further characterized in that w=2 blocks, x=1 block, and y=1 block.

9. A pattern of cellular base station antennae according to claim 7, further characterized in that w=5 blocks, x=2 blocks, and y=1 block.

10. A pattern of cellular base station antennae according to claim 7, further characterized in that w=10 blocks, x=3 blocks, and y=1 block.

11. A pattern of cellular base station antennae according to claim 7, further characterized in that w=3 blocks, x=2 blocks, and y=3 blocks.

12. A method of arranging a microcellular pattern in an area having a first set of parallel streets running in the i direction and a second set of parallel streets running in the j direction and intersecting said first set of streets forming intersections separated by blocks, the method comprising:

establishing a first sequence of microcells B1, B2, B5, B6, each microcell diagonally spaced apart x blocks in the i direction and y blocks in the j direction, each microcell centered over one of said intersections, where x and y represent a distance in blocks;

establishing a second sequence of microcells B3, B4, B7, B8, each second sequential microcell diagonally spaced apart x blocks in the i direction and y blocks in the j direction, each second sequential microcell centered over one of said intersections, said microcell B3 centered on the same street in the i direction as said microcell B1; and allocating each of said microcells B1, B2, B3, B4, B5, B6, B7, B8 a different set of frequencies.

13. The method according to claim 12, further characterized in that x=1 block and y=1 block.

14. The method according to claim 12, further characterized in that x=2 blocks and y=1 block.

15. The method according to claim 12, further characterized in that x=3 blocks and y=1 block.

16. The method according to claim 12, further characterized in that x=2 blocks and y=3 blocks.

17. The method according to claim 12, including the step of repeating said pattern of sequences parallel to said first and second sequences.

18. A pattern of cellular antennae comprising: a first repeating sequence of antennae B1, B2, B1, B2, each of said antennae positioned at an intersection of streets on a grid of intersecting parallel streets, said streets running in either an i direction or a j direction, said grid having blocks defined between said parallel streets, said antennae evenly spaced at a uniform interval of 2x blocks in the i direction and x blocks in the j direction, said sequence of antennae forming a first diagonal line of antennae on said grid;

a second repeating sequence of antennae B3, B4, B3, B4, each of said second sequential antennae positioned at an intersection on said grid, said second sequential antennae evenly spaced at said uniform interval forming a second diagonal line of antennae parallel to said first diagonal line, said second sequence beginning with antenna B3 positioned on the same street as any of said antennae B1; wherein a different set of frequencies is allocated to each antenna B1, B2, B3, and B4.

19. A pattern of cellular antennae according to claim 18, further characterized in that said pattern repeats along said first or said second diagonal lines.

20. A pattern of cellular base station antennae in an area having a first set of parallel streets running in the i direction and a second set of parallel streets running in the j direction, said first set of parallel streets intersecting said second set of parallel streets forming a grid of blocks, said pattern comprising:

a first repeating sequence of base station antennae B1, B2, B5, B6, each of said sequential antennae located at an intersection x blocks in the i direction and y blocks in the j direction from the preceding antenna in sequence;

a second repeating sequence of base station antennae B3, B4, B7, B8, each of said second sequential antennae located at an intersection x blocks in the i direction and y blocks in the j direction from the preceding antenna in said second sequence, said second sequence beginning with antenna B3 positioned at an intersection w blocks in the i direction and z blocks in the j direction from any of said antennae B1;

wherein a different set of frequencies is allocated to each antenna B1, B2, B3, B4, B5, B6, B7, and B8, and w, x, y, and z represent a distance in blocks on any of said streets.

21. A pattern of cellular base station antenna according to claim 20, further characterized in that w=3 blocks, x=2 blocks, y=3 blocks, and z=2 blocks.

* * * * *